Patented July 12, 1932

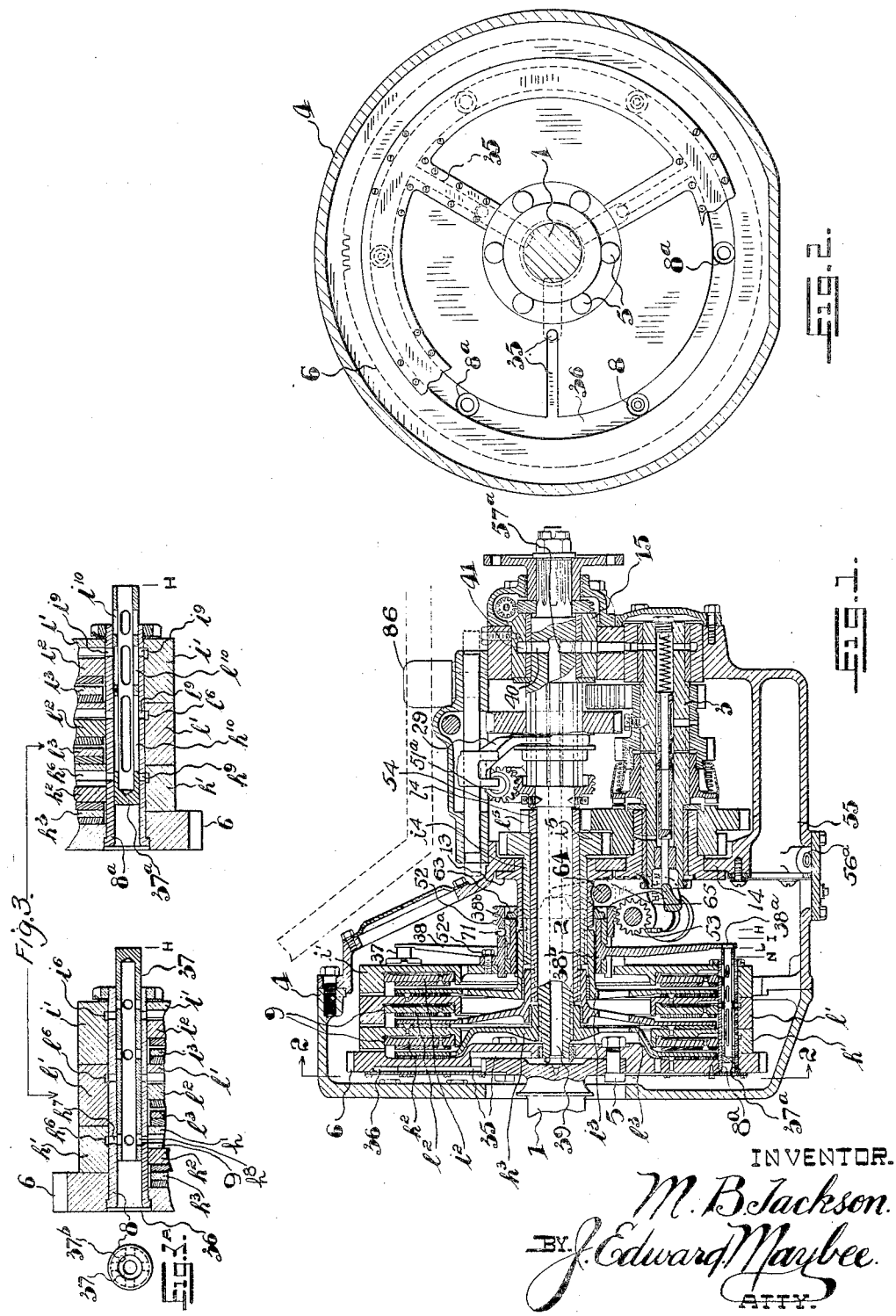

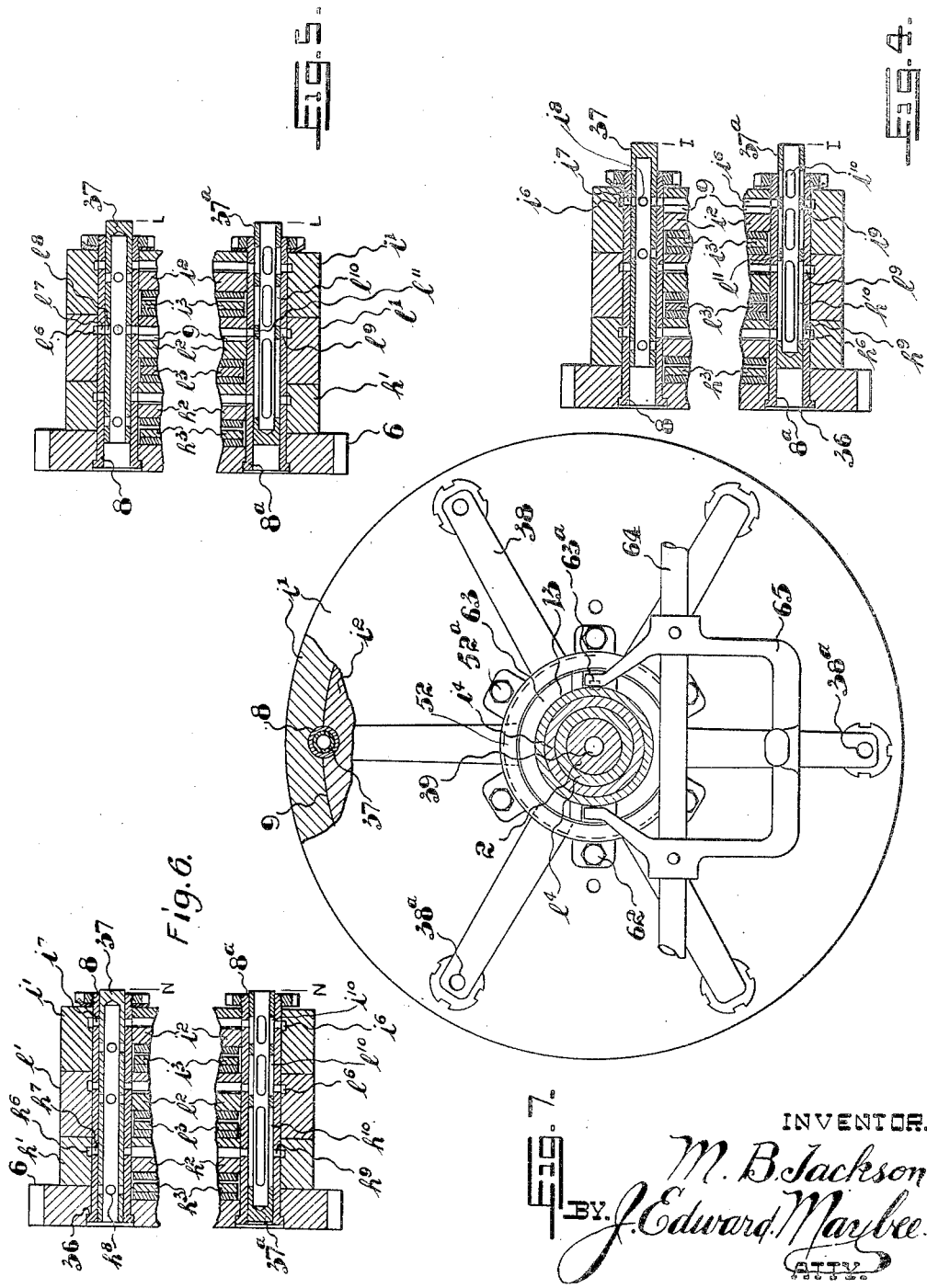

1,866,891

UNITED STATES PATENT OFFICE

MAUNSELL B. JACKSON, OF TORONTO, ONTARIO, CANADA

HYDRAULIC CLUTCH

Application filed March 31, 1927, Serial No. 179,947. Renewed November 30, 1931.

This invention relates to hydraulic clutches and more particularly to that type used in automobiles in connection with change-speed gearing such as disclosed in my prior Patent No. 1,523,648, issued January 20, 1925, and the object of the present invention is to provide clutch mechanism of this character in which the number of parts are reduced to a minimum and in which the various clutches may be quickly thrown into and out of operation.

I attain my object by providing clutch mechanism comprising a plurality of driving members, driven members and rings operable by fluid pressure for clutching the driven members with the driving members. The latter are secured together by means of tubular bolts in which slide valves are mounted for controlling the passage and exit of fluid to operate the rings. Drive connections between the bolts and the rings are provided by forming notches in the peripheries of the rings. The inlet and exhaust slide valves are simultaneously operated by a spider.

The constructions are hereinafter more fully described and illustrated in the accompanying drawings in which Fig. 1 is a longitudinal section of my improved clutch mechanism showning its connection with the parts of an automobile transmission drive;

Fig. 2 a cross section on the line 2—2 in Fig. 1;

Fig. 3 sectional details of the clutches showing the inlet and exhaust valves in position for admitting fluid to actuate the high gear clutch;

Fig. 3ª an end elevation of a valve;

Fig. 4 sectional details of the clutches showing the inlet and exhaust valves in position for admitting fluid to actuate the intermediate gear clutch;

Fig. 5 a view similar to Fig. 4 showing the valves in position for admitting fluid to the low gear clutch;

Fig. 6 a view similar to Fig. 4 showing the valves in neutral position; and

Fig. 7 a cross section through the forward transmission shaft bearing showing the clutches with their valve operating mechanism in side elevation, the clutches being broken away to show the drive connection between a ring and a valve body.

In the constructions hereinafter described the various parts for operating the different mechanisms for obtaining the high, intermediate and low gear ratios are indicated by letters of reference $h$, $i$ and $l$ respectively. Similar parts in the different mechanisms have the same reference numeral after their reference letter so that the letter gives the key to the specific gear ratio mechanism the part is associated with and the numeral indicates the part.

1 is the crank shaft of an engine; 2 is the transmission shaft which is alined with the shaft 1 and is adapted to be connected to the driving wheels of a vehicle by any suitable driving connections; 3 is a countershaft, and 4 is the transmission casing in which the transmission shaft and countershaft are journalled. To the rear end of the crankshaft 1 are secured the driving members of a group of clutches which also serve as a flywheel. The clutches comprise the clutch members 6, $h^1$, $l^1$ and $i^1$, the clutch rings $h^2$, $l^2$ and $i^2$, and the clutch disks $h^3$, $l^3$ and $i^3$ (see Figs. 1 to 6). The clutch member 6 is provided with teeth adapted to mesh with the pinion of an electric starting device (not shown). Bolts 5 secure this clutch member to a flange formed on the crankshaft 1, and bolts 8 and $8^a$ passing through holes formed in the clutch members hold these parts together. The clutch members $h^1$, $l^1$, and $i^1$ are annular and at one side of each member is formed an annular recess 9. The outer and inner walls of the recesses of the members $h^1$, $l^1$, and $i^1$ are adapted to engage the peripheries and the inner surfaces of the clutch rings $h^2$, $l^2$ and $i^2$ respectively, whereby the latter may be moved longitudinally relative to the clutch members. The peripheries of the rings are provided with notches adapted to partially receive the bolts 8 and $8^a$ to form driving connections therewith and to form guides on which the rings slide (see Fig. 7).

The clutch disks $h^3$, $l^3$ and $i^3$ are splined on the transmission shaft 2 and sleeves $l^4$ and $i^4$ respectively, so that the disks may be axially moved thereon. The clutch faces of the disks $h^3$, $l^3$ and $i^3$ lie between the adjacent clutch faces formed on the clutch rings $h^2$, $l^2$ and $i^2$ and on the clutch members 6, $h^1$ and $l^1$ respectively. From the above description it is evident that any one of the clutch disks may be given a driving connection with the corresponding clutch member by moving the clutch ring for that disk towards its co-operating clutch member to frictionally engage the clutch faces of the disk between them. The means for accomplishing this will hereinafter be described.

The sleeve $i^4$ is journalled in a flanged bearing 13 which is secured to a transverse wall 14 formed in the transmission casing 4. In this sleeve is journalled the sleeve $l^4$ in which is journalled one end of the transmission shaft 2. The other end of this shaft is journalled in a bearing 15 carried by the rear end of the casing 4. On the ends of the sleeves $i^4$ and $l^4$, which are remote from the disks $i^3$ and $l^3$ are formed or secured the pinions $i^5$ and $l^5$ respectively. These pinions may drive the countershaft 3 which in turn may drive the transmission shaft 2 in any suitable manner.

The transmission shaft 2 may be driven at different gear ratios by the operation of the clutch disks $h^3$, $l^3$ and $i^3$ as described, the disk $h^3$ being adapted to form a direct drive for the transmission shaft, whereby the latter is driven at the same speed as the engine shaft 1, the disks $l^3$ and $i^3$ being adapted to form part of the drive connection between the engine and the transmission shaft at a low and an intermediate speed respectively, relative to the speed of the engine shaft.

To actuate any one of the clutch rings $h^2$, $l^2$ and $i^2$ to frictionally engage its clutch disk $h^3$, $l^3$ and $i^3$ respectively, I provide means for supplying fluid under pressure to actuate these rings, which pressure fluid is controlled by means of manually operated valves.

In the clutch member 6 are formed the radially disposed fluid passages 35, the outer ends of which communicate with an annular groove 36 also formed in the member 6 (see Figs. 1 to 7). The bolts 8 and $8^a$ are tubular and each has a shoulder at one end for engaging the bottom of the groove 36, the other end being provided with a lock washer and nut for engaging the member $i^1$. The shoulders are of less thickness than the depth of the groove so that the interiors of the tubular bolts communicate with the groove and thus with the fluid passages 35. In the walls of the bolts 8 are formed a plurality of inlet ports $h^7$, $l^7$ and $i^7$ which communicate with fluid chambers $h^6$, $l^6$ and $i^6$. These fluid chambers are formed in the clutch members $h^1$, $l^1$ and $i^1$, and communicate, behind the clutch rings $h^2$, $l^2$ and $i^2$, with the recesses 9 formed in the clutch members. A hollow piston valve 37, slidably mounted in each of the combined bolts and valve bodies 8, has its open end communicating with the fluid supply passage 35 and has a plurality of passages $h^8$, $l^8$ and $i^8$ formed in its wall. The passages $h^8$, $l^8$ and $i^8$ are adapted to be brought into register successively with the inlet ports $h^7$, $l^7$ and $i^7$ to supply any one of the latter, and thus its recess 9, with fluid. The passages are so arranged that when any one port is open the remaining ports are closed and when the valve is moved to its neutral position all the ports are closed.

Exhaust ports $h^9$, $l^9$ and $i^9$, formed in the walls of the bolts $8^a$, communicate with the chambers $h^6$, $l^6$ and $i^6$ respectively. The bolts thus form valve bodies having their open ends communicating with the exterior of the clutch members. Each of the valves $37^a$ has a plurality of fluid exit passages $h^{10}$, $l^{10}$ and $i^{10}$ formed in its wall and adapted to be brought into register with the exhaust ports $h^9$, $l^9$ and $i^9$. The exhaust valves $37^a$ are adapted to close the exhaust ports of that one of the fluid chambers $h^6$, $l^6$ or $i^6$ which is in communication with the fluid supply passage 35 and to register their exit passages $h^{10}$, $l^{10}$ or $i^{10}$ with the other exhaust ports in the valve bodies $8^a$. When the exhaust valves are moved to their neutral positions, all the exhaust ports are opened. The exhaust valves are so arranged relative to the fluid chambers that the centrifugal action of the fluid in the latter tends to force the fluid through the exhaust valves and creates a vacuum in the fluid chambers and the recesses 9 which tends to draw the clutch rings to their normal positions. The valves 37 and $37^a$ are keyed at $37^b$ in the valve bodies 8 and $8^a$ to prevent relative rotary movement between these parts (see Fig. $3^a$).

It is desirable to provide means for softening the clutching engagement of the low speed clutch disk $l^3$ so that the vehicle will start smoothly from rest. This is accomplished by forming a minute relief opening $l^{11}$ in each exhaust piston valve $37^a$ which openings are registered with the exhaust ports $l^9$ when the inlet passages $l^8$ are in register with the inlet ports $l^7$. From this description it is obvious that a small flow of fluid escapes from the fluid chamber $l^6$ while the latter is being supplied with fluid which retards the building up of pressure in the said chamber and in the recess in communication therewith.

It will be noted that the fluid under pressure in the valve bodies 8 and $8^a$ tends to move the piston valves 37 and $37^a$ towards their position for admitting fluid to the chamber $h^6$ and for closing the exhaust fluid therefrom. This position is indicated at H in Figs. 1 and 3. The valves are simultaneously moved, by means of a spider 38, to their intermediate, low and neutral positions as indicated at I, L and N respectively in Figs. 1, 4, 5 and 6. The spider is provided with fluid outlet openings 38ª which are in alinement with the bores of the exhaust piston valves 37ª. The method of carrying this spider will be hereinafter described.

The ends of the fluid passages 35 that are remote from the groove 36 communicate with a conduit 39 formed axially of the transmission shaft 2 (see Figs. 1 and 7). The conduit communicates, by means of radially directed passages 40, with an annular groove 41 formed in the bearing 15.

To supply the passages with fluid I provide rotary gear pumps (not shown), one of the pumps being driven from the engine shaft by a helical gear 52 which meshes with a helical gear 53 on the pump shaft, the other pump being driven by helical gearing 54, one gear of which is secured to the transmission shaft 2 and the other to the pump shaft 51ª. With this arrangement a supply of liquid will be provided to operate the clutches when the engine is started and the supply will be increased when the transmission shaft is rotated. In the rear end of the transmission casing is formed a sump or liquid chamber 55 having a screened opening communicating with the composite clutch member which is located in front of the transverse wall 14. The inlet openings of the pumps communicate by means of a passage 56ª with the bottom of the sump and the outlet or exhaust openings of the pumps communicate by means of a passage 57ª with the annular groove 41.

The plunger valves 37 and 37ª in the clutch members are simultaneously actuated in the following manner by a manually operated device such as a foot pedal (not shown). The gear 52 is formed on a sleeve provided with lugs which are secured, by means of bolts 52ª, to the clutch member $i^1$. In the sleeve is slidably mounted the hub 38ᵇ of the spider 38, the arms thereof being passed through slots formed in the sleeve between adjacent lugs of the gear 52. The slots permit the spider to be moved axially of the gear and the walls of the slots form a driving connection with the spider arms. On the bearing 13 is slidably mounted a thrust collar 63 which is adapted to pass freely through the bore of the gear 52 and to engage the hub 38ᵇ. The collar is keyed at 63ª to prevent it from rotating on the bearing. On a transverse shaft 64 journalled in the casing are secured the legs of a U shaped lever 65. The free ends of the legs are adapted to engage the thrust collar 63 on opposite sides of the bearing 13, see Figs. 1 and 7. The shaft 64 may be connected in any suitable manner with the above mentioned foot pedal and may be provided with suitable spring means tending to move the lever 65 to its high gear position.

A click device including a spring pressed ball 71 carried by the gear 52 and adapted to engage two indentations in the hub 38ᵇ of the spider determines the correct intermediate and low gear positions for the spider (see Fig. 1). This click device is felt by the foot when the shaft 64 is rocked to move the lever 65; neutral and high gear positions are respectively determined by rocking the lever to its downward limit of movement, and by permitting the spring means to move the lever to its limit of movement in the opposite direction.

Assuming the engine is running and the lever 65 is in neutral position with the valve plungers 37, 37ª at N in Figs. 1 and 6 and it is desired to drive the high gear clutch, the mode of operation is as follows. The inlet and exhaust ports in the clutches are now closed and opened respectively as shown in Fig. 6. The lever 65 is gently released until the entrance of the ball 71 into its first depression is felt. The above valve plungers are now positioned as indicated at L in Figs. 1 and 5 with the small leakage openings $l^{11}$ in register with the exhaust ports $l^9$, and the passages $l^5$ in register with the inlet ports $l^7$. The foot pedal and thus the shaft 64 and lever 65 are in low gear position and the next step is to further release the pedal to permit the spring means to rock the lever 65 into intermediate gear position which is indicated by the ball 71 entering its second depression. The valve plungers are now positioned as indicated at I in Figs. 1 and 4. The inlet ports $i^7$ are now in communication with the fluid supply passage 35, the exhaust ports $i^9$ are closed and the fluid exit passage $h^{10}$ forms a communication between the exhaust port $h^9$ and $l^9$ and the interior of the plunger 37ª which communicates with the exterior of the clutch. The foot pedal shaft 64 and lever 65 are then fully released to permit them to move into high gear position. The plungers 37 and 37ª are actuated by the fluid in the valve bodies 8 and 8ª to their high gear position as indicated at H in Fig. 3 whereby the inlet ports $h^7$ are opened, the exhaust ports $h^9$ are closed, and the exhaust ports $l^9$ and $i^9$ communicate, by means of the passages $h^{10}$ and $l^{10}$ respectively, and the openings 38ª in the spider with the exterior of the clutches.

What I claim is:

1. A clutch including a driving member provided with an annular recess; a disk; a ring having a driving connection with the member and slidably mounted in the recess; a fluid supply passage communicating with the recess; an exhaust passage communicating with the recess and with the exterior of the clutch; a manually operable valve in the fluid supply passage carried by the driving member for controlling the flow of fluid into the recess; and a manually operable valve in the exhaust passage carried by the driving member for controlling the exit of the fluid from the recess.

2. A clutch including a driving member provided with an annular recess; a disk; a ring having a driving connection with the member and slidably mounted in the recess; a fluid supply passage communicating with the recess; an exhaust passage communicating with the recess and with the exterior of the clutch; a valve in the fluid supply passage carried by the driving member for controlling the flow of fluid into the recess; a valve in the exhaust passage carried by the driving member for controlling the exit of the fluid from the recess; and manually operable means for simultaneously operating the said valves.

3. A clutch including a driving member provided with an annular recess; a disk; a ring having a driving connection with the member and slidably mounted in the recess; a fluid supply passage communicating with the recess; an exhaust passage communicating with the recess and with the exterior of the clutch; a valve in the fluid supply passage for controlling the flow of fluid into the recess; a valve in the exhaust passage for controlling the exit of the fluid from the recess; and means including a spider adapted to actuate both valves.

4. A clutch including a driving member provided with an annular recess; a disk; a ring having a driving connection with the member and slidably mounted in the recess; a fluid supply passage communicating with the recess; an exhaust passage communicating with the recess and with the exterior of the clutch, the exhaust passage also having a communication with the fluid supply passage; a valve in the fluid supply passage for controlling the flow of fluid into the recess; a valve in the exhaust passage for controlling the exit of fluid from the recess, the fluid tending to move the valves in one direction; and means for controlling the operation of the valves and for moving them in the opposite direction.

5. A clutch including a driving member provided with an annular recess; a disk; a ring having a driving connection with the member and slidably mounted in the recess; a fluid supply passage communicating with the recess; an exhaust passage communicating with the recess and with the exterior of the clutch, the exhaust passage also having a communication with the fluid supply passage; a valve in the fluid supply passage for controlling the flow of fluid into the recess; a valve in the exhaust passage for controlling the exit of fluid from the recess, the fluid tending to move the valves in one direction; and means including a spider adapted to engage both valves to move them in the opposite direction or to permit them to be moved by the fluid.

6. A clutch including a driving member provided with an annular recess; a disk; a fluid supply passage; a slide valve having a body carried by the driving member for controlling the passage of fluid to the recess; and a ring slidably mounted in the recess for frictional engagement with the disk and engaging the slide valve body to form a rotary drive connection with the member.

7. A clutch including a driving member provided with an annular recess; a disk; a fluid supply passage; a slide valve for controlling the passage of fluid to the recess and including a body carried by the driving member; a slide valve for controlling the exit of fluid from the recess and including a body carried by the driving member; a ring slidably mounted for axial movement in the recess and engaging the slide valve bodies for forming a rotary drive connection with the driving member; and means for controlling the valves to cause the ring to be axially moved into frictional engagement with the disk and to permit the ring to be moved out of engagement therewith.

8. Clutch mechanism including a plurality of driving members, one being provided with an annular recess; a disk; a ring slidably mounted in the recess and having a driving connection with one of the members; a fluid supply passage; a tubular bolt for securing the members together, the interior of the bolt communicating with the passage and with the recess; and a plunger mounted in the bolt for controlling the communication with the recess.

9. Clutch mechanism including a plurality of driving members, one being provided with an annular recess; a disk; a fluid supply passage; a plurality of tubular bolts for securing the members together, the bolts having ports communicating with the recess; a ring slidably mounted in the recess and provided with peripheral notches for engagement with the bolts; an inlet valve slidably mounted in one of the bolts for forming a communication between the port therein and the fluid supply passage; and an exhaust valve slidably mounted in the other bolt for forming a communication between the port therein and the exterior of the clutch.

10. The combination of a group of clutches; means for applying fluid under pressure to actuate the different clutches including a slide valve for controlling the admission of fluid to the different clutches; and a slide valve for controlling the exit of fluid from the different clutches.

11. Clutch mechanism including a plurality of driving members having recesses formed therein; a ring slidably mounted in each recess and having a rotary drive connection with a driving member; disks adapted to be engaged by the rings; a fluid supply passage; a manually operable slide valve carried by the driving members for controlling the passage of fluid to any one of the recesses; and a manually operable slide valve carried by the driving members for controlling the exit of fluid from the recesses.

12. Clutch mechanism including a plurality of driving members having recesses formed therein; a ring slidably mounted in each recess and having a rotary drive connection with a driving member; disks adapted to be engaged by the rings; a fluid supply passage; a slide valve carried by the driving members including a body having a plurality of inlet ports communicating with the recesses; a plunger slidably mounted in the valve body and provided with a plurality of passages, each passage communicating with the fluid supply passage and adapted to be brought into communication with a port; exhaust ports communicating with the recesses and with the exterior of the clutch; and means for closing the exhaust port of the recess in communication with the fluid supply passage and for opening the remaining exhaust ports.

13. Clutch mechanism including a plurality of driving members having recesses formed therein; a ring slidably mounted in each recess and having a rotary drive connection with a driving member; disks adapted to be engaged by the rings; a fluid supply passage; a slide valve carried by the driving members including a body having a plurality of inlet ports communicating with the recesses; a hollow piston valve slidably mounted in the valve body and having an open end communicating with the fluid supply passage, the walls of the valve being provided with passages communicating with the interior of the valve, each passage being adapted to be brought into register with a port to supply its recess with fluid, the remaining ports being closed by the valve; a second slide valve carried by the driving members including a body communicating with the fluid supply passage and having a plurality of exhaust ports communicating with the recesses; a hollow piston valve slidably mounted in the second valve body and having an open end communicating with the exterior of the clutch, and walls of the last mentioned valve being provided with spaced passages communicating with the interior of the valve, the last mentioned valve being adapted to close the exhaust port of the recess in communication with the fluid supply passage and to register its passages with the remaining exhaust ports, the fluid tending to move the piston valves in one direction; and manually operable means for controlling the operation of the valves and for moving them in the opposite direction.

14. Clutch mechanism including a plurality of driving members having recesses formed therein; a ring slidably mounted in each recess and having a rotary drive connection with a driving member; disks adapted to be engaged by the rings; fluid pressure means adapted to supply any one of the recesses with fluid to actuate its ring into frictional engagement with the co-operating disk; exhaust ports for forming a communication between the recesses and the exterior of the members; and means including a valve for closing any desired exhaust port and opening the remaining ports, the valve being provided with a minute relief opening adapted to be registered with one of the ports to retard the building up of pressure in the recess communicating with the last mentioned port.

15. The combination of a group of clutches having a common axis; means for applying fluid under pressure to actuate the different clutches including a slide valve carried thereby for controlling the admission of fluid to the different clutches; a slide valve carried by the clutches parallel to the axis and adjacent the periphery thereof for controlling the exit of fluid from the different clutches; and manually operable means for simultaneously actuating the valves.

16. The combination of a group of clutches having a common axis; means for applying fluid under pressure to actuate the different clutches including a slide valve carried thereby for controlling the admission of fluid to the different clutches; a slide valve carried by the clutches parallel to the axis and adjacent the periphery thereof for controlling the exit of fluid from the different clutches, the fluid pressure tending to move the valves in one direction; and means for controlling the valves and for actuating them in the opposite direction.

17. The combination of a group of clutches; a source of fluid supply; tubular bolts for securing the clutches together; and valves mounted in the bolts for controlling the admission of fluid to the different clutches and the exhaust of fluid therefrom.

18. The combination of a group of clutches; means for applying fluid under pressure to actuate the different clutches including a slide valve for controlling the admission of fluid thereto; and a slide valve for controlling the exit of fluid from the different clutches, the last mentioned valve being provided with a minute relief opening adapted to retard the building up of pressure in one of the clutches.

19. A clutch including a driving member; means for supplying fluid under pressure to actuate the clutch; a slide valve carried by the driving member for controlling the admission of fluid to the clutch; a sleeve secured to the driving member and provided with a slot; a spider provided with a hub slidably mounted in the sleeve and an arm passing through the slot to actuate the slide valve; and means for operating the spider axially.

Signed at Toronto, Canada, this 24th day of March, 1927.

MAUNSELL B. JACKSON.